(12) United States Patent
Ivry

(10) Patent No.: US 8,009,993 B2
(45) Date of Patent: Aug. 30, 2011

(54) HYBRID BALANCED CODING SCHEME

(75) Inventor: Raanan Ivry, Caesarea (IL)

(73) Assignee: PMC-Sierra Israel Ltd., Herzliya (IL)

( * ) Notice: Subject to any disclaimer, the term of this patent is extended or adjusted under 35 U.S.C. 154(b) by 491 days.

(21) Appl. No.: 12/331,457

(22) Filed: Dec. 10, 2008

(65) Prior Publication Data

US 2010/0142975 A1 Jun. 10, 2010

(51) Int. Cl.
*H04B 10/00* (2006.01)

(52) U.S. Cl. ......... 398/141; 398/140; 398/183; 398/185

(58) Field of Classification Search .......... 398/182–201, 398/140–141
See application file for complete search history.

(56) References Cited

U.S. PATENT DOCUMENTS

| | | | |
|---|---|---|---|
| 5,243,628 A | 9/1993 | Moritoki et al. | |
| 5,387,911 A * | 2/1995 | Gleichert et al. | 341/95 |
| 5,539,846 A * | 7/1996 | Morikura et al. | 385/24 |
| 5,633,631 A * | 5/1997 | Teckman | 341/58 |
| 6,198,413 B1 | 3/2001 | Widmer | |
| 6,351,501 B1 | 2/2002 | Murdock | |
| 6,621,427 B2 | 9/2003 | Greenstreet | |
| 6,628,213 B2 | 9/2003 | Nagata | |
| 6,754,238 B1 * | 6/2004 | Lentine et al. | 370/528 |
| 6,768,429 B2 * | 7/2004 | Kuo et al. | 341/58 |
| 6,986,094 B2 * | 1/2006 | Grimsrud | 714/759 |
| 7,123,173 B1 * | 10/2006 | Grivna | 341/58 |
| 7,187,307 B1 * | 3/2007 | Schmidt et al. | 341/50 |
| 7,269,126 B2 * | 9/2007 | Mennekens et al. | 370/208 |
| 7,346,094 B2 * | 3/2008 | Cranford et al. | 375/130 |
| 7,570,591 B2 * | 8/2009 | Dove | 370/236 |
| 2004/0240580 A1 * | 12/2004 | Bessios et al. | 375/288 |
| 2006/0093147 A1 * | 5/2006 | Kwon et al. | 380/268 |
| 2010/0142975 A1 * | 6/2010 | Ivry | 398/182 |

* cited by examiner

*Primary Examiner* — Agustin Bello
(74) *Attorney, Agent, or Firm* — Mark M. Friedman

(57) ABSTRACT

A hybrid balanced code is formed from a low rate (narrow bandwidth) balanced code and a high rate (wide bandwidth) low density code. Data encoded using the hybrid balanced code is transmitted between a first communication network entity and a second communication network entity. The hybrid code enables a system having a hybrid transmitter to transmit either a low rate stream detectable by a low rate receiver or a hybrid stream, from which the low rate data may be detected by a low rate receiver while both the high rate data and the low rate data may be detected by a high rate receiver.

18 Claims, 4 Drawing Sheets

L – Number of Type 2 bits in Type 1 symbol

Max – Max { |<# of 1s> - <# of 0s>| } In a symbol

Num – Maximum number of iterations

HYBRID BALANCED CODING SCHEME

FIELD OF THE INVENTION

The invention relates in general to coding in communication networks and in particular to balanced coding in such communications.

BACKGROUND OF THE INVENTION

Balanced codes (encoded sequences) have gained a lot of interest, since they can be received using a simple AC (Alternate Current)-coupled interface, which is simpler and more compatible with major interface types than a DC (Direct Current)-coupled interface. A balanced code can be defined in a number of ways: a) a code in which the number of 0s and 1s within a length of any N consecutive bits is close to equal; b) a code in which the number of 1s and 0s within any length of M symbols is identical or close to identical; c) a code constructed such that the frequency spectrum resulting from the transmission of any code word has no DC component; or d) a code that has a finite digital sum variation. The use of "balanced code" in this application should be understood as including any of the definitions above.

The superposition of two encoded sequences over one channel has also gained of a lot of interest, as shown in U.S. Pat. Nos. 6,621,427, 6,351,501, 6,198,413, 6,628,213, 5,539,846 and 5,243,628. Usually, each encoded sequence carries different types of information. In such applications, the two superimposed encoded sequences generate a new code which needs to be balanced for reception with an AC-coupled interface.

Much of the existing communication network infrastructure, in particular in Ethernet Passive Optical Networks (EPON), uses low rate transmissions, for example 1 Gigabit per second (Gbps). We refer to such low rate transmission networks or communication systems as "old". With the introduction of new high speed transmission systems such as 10 Gbps EPON, there is a need to continue using and to retrofit "old" systems in the simplest and most inexpensive way to carry the new high rate traffic. The use of known two code superposition schemes cannot answer this need, since such coding schemes are complex, change the original (low rate) coding and do not enable to detect only one of the encoded sequences.

SUMMARY OF THE INVENTION

The invention discloses a Hybrid Balanced Coding scheme (also referred to simply as "hybrid coding" or "Hybrid Code") which represents a family of pairs of codes. Each code in the family of Hybrid Codes is generated from two different codes, a high rate code and a low rate code. In some embodiments, the Hybrid Code generation is by an Exclusive Or ("XOR") operation. The high rate code is superposed on the low rate code, leaving the main characteristics of the low rate code unchanged. The low rate code is defined to be a balanced code, while the high rate code is defined to be a low density code. The resulting Hybrid Code is a balanced code with certain properties.

Note that the use of the XOR operation, while preferable, does not exclude the use of other operations for generating a Hybrid Code of the invention. For example, another possible operation to generate the Hybrid Code is a conditional Add or Subtract operation, where the condition is the polarity of the low rate code: if the low rate symbol is "1", subtract the high rate symbol and if the high rate symbol is "0", add the high rate symbol. Regardless of the type of operation used to generate it, the resulting Hybrid Code can be separated into low rate balanced code and high rate low density code streams. For simplicity, the invention is explained in detail with reference to the XOR operation, which has an added advantage of being very simple to implement.

The information from each of the two codes forming the Hybrid Code can be detected. Specifically, the low rate code can be easily detected by using a simple low pass filter (LPF) which filters the high rate code. The family of pairs of Hybrid Codes can be used to upgrade an "old" low rate communication system to a "new" high rate communication system such that the new, hybrid balanced code, is compatible with the old system (in which the old low rate code can be detected by an "old" low rate receiver), while the new system can operate at a higher rate. In other words, the old low rate system can receive the Hybrid Code as if it were low rate transmission, while the new, high rate system can receive the Hybrid Code and detect both the low rate data and the high rate data.

The common 8b10b coding (in Ethernet and other types of communication systems) is one type of low rate coding. In particular, the Hybrid Balanced Coding scheme of the invention can be used to upgrade "old" 8b10b-based systems to higher rate systems while retaining compatibility with the old systems. Thus, a 1 Gbps EPON (an example of an "old" 8b 10b-based system) can be upgraded to a 10 Gbps EPON.

According to the invention there is provided a method for transmitting encoded data including the steps of forming a hybrid balanced code from a low rate balanced code and a high rate low density code and transmitting data encoded using the hybrid balanced code between a first communication network entity and a second communication network entity.

In some embodiments of the method, the step of forming a hybrid balanced code includes performing a XOR operation between the low rate balanced code and the high rate low density code.

In some embodiments, the method further includes the step of separately detecting data encoded with the low rate balanced code and data encoded with the high rate, low density code.

In some embodiments of the method, the first communication network entity is an optical line terminal (OLT) and the second communication network entity is an optical network unit (ONU).

In some embodiments of the method, the low rate balanced code is a 8b10b code.

In some embodiments of the method, the high rate low density code is a 4-bit data 8-bit symbol low density code.

In some embodiments of the method, the low rate includes a 1 Gigabit per second (Gbps) rate and wherein the high rate includes a 10 Gbps rate.

According to the invention there is provided a system for transmitting encoded data including a first network unit for transmitting data coded in a hybrid balanced code formed from a low rate balanced code and a high rate low density code and a second network unit operative to receive at least part of the data coded in a hybrid balanced code.

In some embodiments of the system, the first communication network entity is an OLT and the second communication network entity is an optical network unit ONU.

BRIEF DESCRIPTION OF THE DRAWINGS

The invention is herein described, by way of example only, with reference to the accompanying drawings, wherein.

DETAILED DESCRIPTION OF THE INVENTION

The Hybrid Balanced Coding scheme is a family of pairs of codes that generates a new, hybrid balanced code from a "Type 1" low rate balanced code and a "Type 2" high rate low density code. In some embodiments, the generation is done by a simple XOR operation between the Type 1 and Type 2 codes. Moreover, by using a simple Low Pass Filter (LPR), the high rate code is removed (low pass filtered) and the low rate code can be easily detected.

Figure 1:
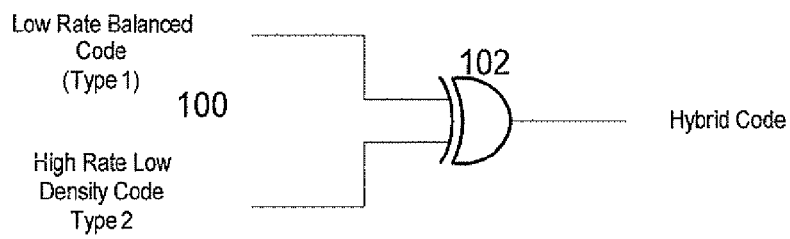
FIG. 1 shows a general Hybrid Balanced Coding scheme of the invention.

FIG. 1 shows a general circuit 100 which generates a Hybrid Balanced Coding scheme. Circuit 100 includes a simple XOR logic gate 102 which receives Type 1 and Type 2 codes and superimposes them into a single, combined Hybrid Code. The Type 1 code is a low rate balanced code, with equal number of 1s and 0s. The Type 2 code is a high rate, low density code, with more 0s than 1s in each symbol. The two code types are explained next.

A Type 1, low rate balanced code, may be defined as any code in which the number of 1s is "equal" to the number of 0s in a consecutive, defined number of bits. "Equal" may mean that the number of 1s is exactly the same as, or is statistically equal to, the number of 0s. A "low rate balanced code" may also be defined as a code in which the number of 1s is not higher or lower than the number of 0s by more than a defined number. Examples for Type 1 codes can be 010101 . . . , which carry no information in it, the common 8b10b code which carries 8 bits of data in each 10 bit symbol, the 4b5b code, any PRBS (Pseudo Random Bit Stream) code and others.

A Type 2, high rate low density code is a code which consists of equal length symbols, L bits each. Each L bit symbol represents a data word of K bits (L>K). The number of 1s in each symbol is smaller than the number of 0s. The number of 1s may be equal for all the symbol possibilities or may be defined as smaller than a certain number. Two examples of high rate, low density codes are shown in Table 1 and Table 2.

TABLE 1

3-Bit Data 8-bit Symbol Low Density Code

| Data | Codeword |
| --- | --- |
| 000 | 10000000 |
| 001 | 01000000 |

TABLE 1-continued

3-Bit Data 8-bit Symbol Low Density Code

| Data | Codeword |
| --- | --- |
| 010 | 00100000 |
| 011 | 00010000 |
| 100 | 00001000 |
| 101 | 00000100 |
| 110 | 00000010 |
| 111 | 00000001 |

TABLE 2

4-Bit Data 8-bit Symbol Low Density Code

| Data | Codeword |
| --- | --- |
| 0000 | 10000000 |
| 0001 | 01000000 |
| 0010 | 00100000 |
| 0011 | 00010000 |
| 0100 | 00001000 |
| 0101 | 00000100 |
| 0110 | 00000010 |
| 0111 | 00000001 |
| 1000 | 10000001 |
| 1001 | 10000010 |
| 1010 | 01000001 |
| 1011 | 10000100 |
| 1100 | 01000010 |
| 1101 | 00100001 |
| 1110 | 01000100 |
| 1111 | 00100010 |

Figure 2:
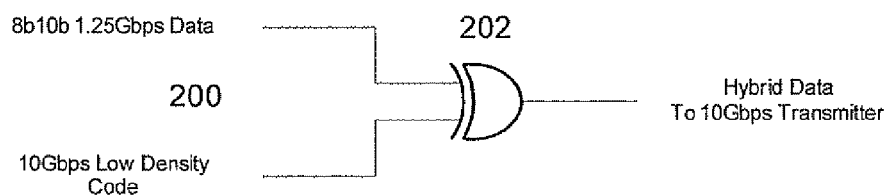
FIG. 2 shows a special case of Hybrid Balanced Coding scheme of the invention based on 8b10b-encoded low-rate code

The duration of each bit of a Type 1 codeword is equal to the duration of each symbol of a Type 2 code. This means that the duration of 1 bit of Type 1 code is equal to L bits of Type 2 code. Also, when performing the XOR operation in FIG. 1, each symbol of Type 2 code is aligned to each bit of Type 1 bit, as in the example shown in FIG. 2.

Figure 3:
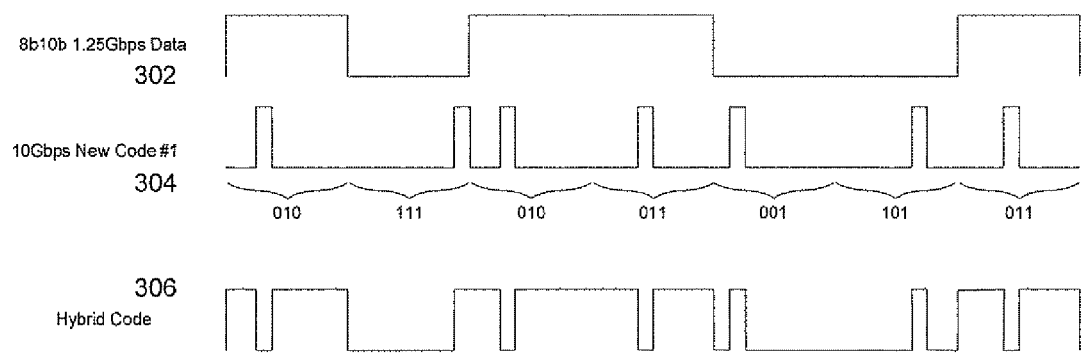
FIG. 3 shows an example of a 10 Gbps rate Hybrid Code of the invention based on 8b10b-encoded 1.25 Gbps.

A special case of Hybrid Balanced Coding according to the invention is shown in FIG. 3. The Type 1 code 302 is of 8b10b type encoded at 1.25 Gbps, and the Type 2 code is a low density code 304 defined in Table 1. Code 302 and code 304 are combined (using the XOR operation) to generate a 10 Gbps rate Hybrid Code 306.

Figure 4:
FIG. 4 shows a low rate decoding of Hybrid Code using a low pass filter.

FIG. 4 shows the process of low rate decoding (i.e. of detecting only the low rate code by removing the high rate code) of a Hybrid Code in an old system defined as a narrow band system. The high frequency components are removed using a low pass filter LPF 402 and the low-frequency components are translated to data using a Type 1 decoder 404. The LPF is an inherent part of an old system because of its limited bandwidth.

Figure 5:
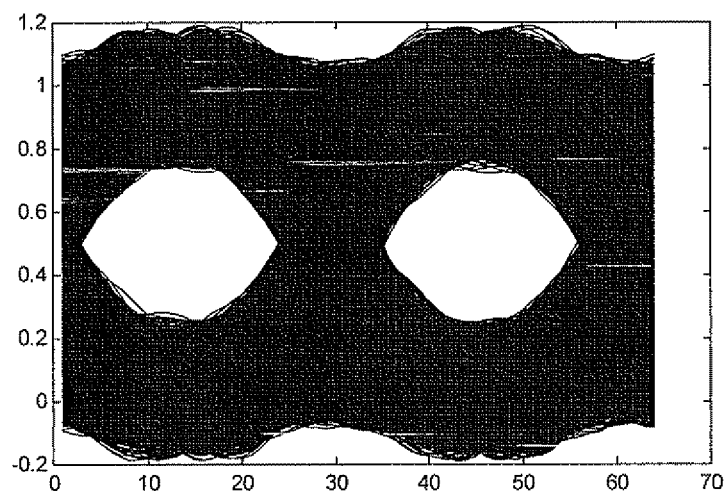
FIG. 5 shows a first example of an eye-diagram at the output of the LPF (Low Pass Filter)
Figure 6:
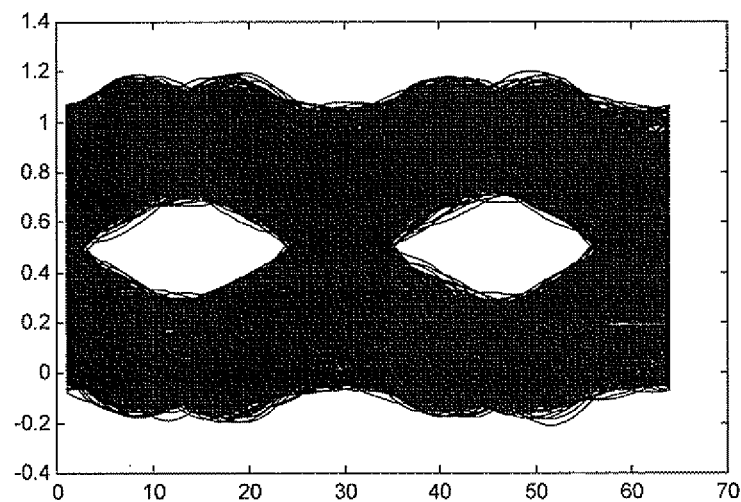
FIG. 6 shows a second example of an eye-diagram at the output of the LPF.

FIG. 5 shows an eye-diagram of a Hybrid Code using the Type 1 8b10b code and the Type 2 code defined in Table 1, as shown in FIG. 3. FIG. 6 shows an eye-diagram of a Hybrid Code using the Type 1 8b10b code and the Type 2 code defined in Table 1. In both FIG. 5 and FIG. 6, the eye diagram consists of two low rate symbols with amplitudes from 0 to 1 filtered by an LPF. It is seen that the higher the rate of the high rate code (4 bits of information per symbol in Table 2 as opposed to 3 bits of information per symbol in Table 1) the worse the performance (the jitter and noise are higher).

Figure 7:
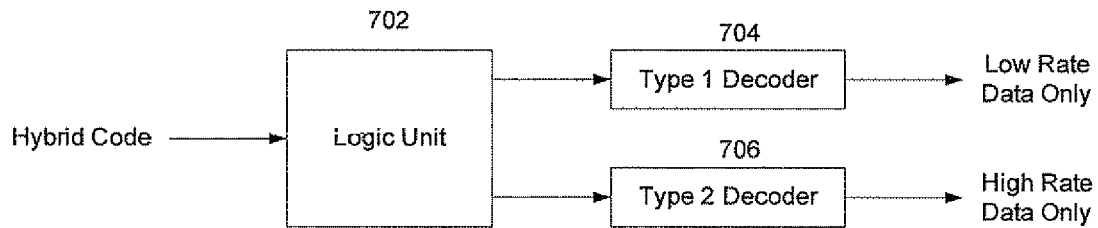
FIG. 7 shows a fully digital decoding of the Hybrid Code.

A fully digital decoding of a Hybrid Code is shown in FIG. 7. The Hybrid Code is the input to a logic unit 702. The logic unit separates the Type 1 and Type 2 codes by counting the number of high rate 1 bits in each L-bit symbol (after the delineation of FIG. 8). If the number of 1s is higher than the number of 0s, the low rate bit is 1 and the L-bit symbol is inverted. If not, the low rate bit is 0, and the L-bit symbol is not inverted. Each of the codes is respectively decoded in a Type 1 decoder 704 and a Type 2 decoder 706. Synchronization (delineation) is performed as shown in the flow chart of FIG. 8. Note that the scheme in FIG. 8 assumes no errors. If errors are expected, additional logic is required to the flow chart of FIG. 8.

The Type 1 and Type 2 decoders depend on the type of codes. In the examples shown in this embodiment, the low rate decoder is the famous 8b10b decoder, while the high rate decoder uses Table 1 and Table 2 to decode each codeword into a data sequence.

Figure 8:
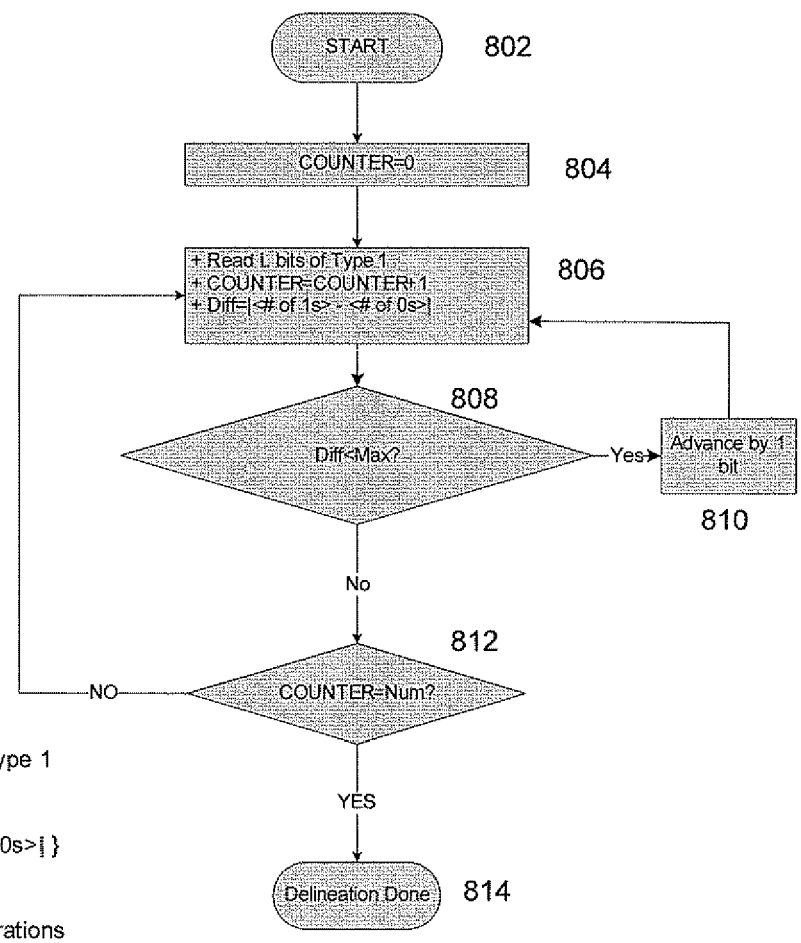
FIG. 8 shows a logic separation between Type 1 and Type 2 codes.

FIG. 8 shows a possible delineation method, i.e. a way to detect the exact beginning of a low rate bit or the beginning of a high rate symbol (of L bits). The bits in the block diagram of FIG. 8 are always high rate bits. After a start in step 802, a COUNTER is reset in step 804. Next, L consecutive high rate coded bits (D(n+1), . . . , D(n+L), n=1, L+1, 2L+1, . . . ) are read and a difference Diff between the number of 1s and 0s (absolute value) is calculated in step 806, in which COUNTER is also advanced by 1. If Diff is lower than Max (the maximum possible absolute difference between the number of 1s and 0s) in a check step 808, the next L high rate bits are advanced (D(n+2), . . . , D(n+L+1), n=1, L+1, 2L+1, . . . ) in step 810. The COUNTER is checked against a number Num in step 812. As long as the COUNTER is lower than Num, the process in steps 806-812 is repeated i.e. there are Num iterations). When the COUNTER equals Num, a delineation is done in step 814.

Specific Example

Figure 9:
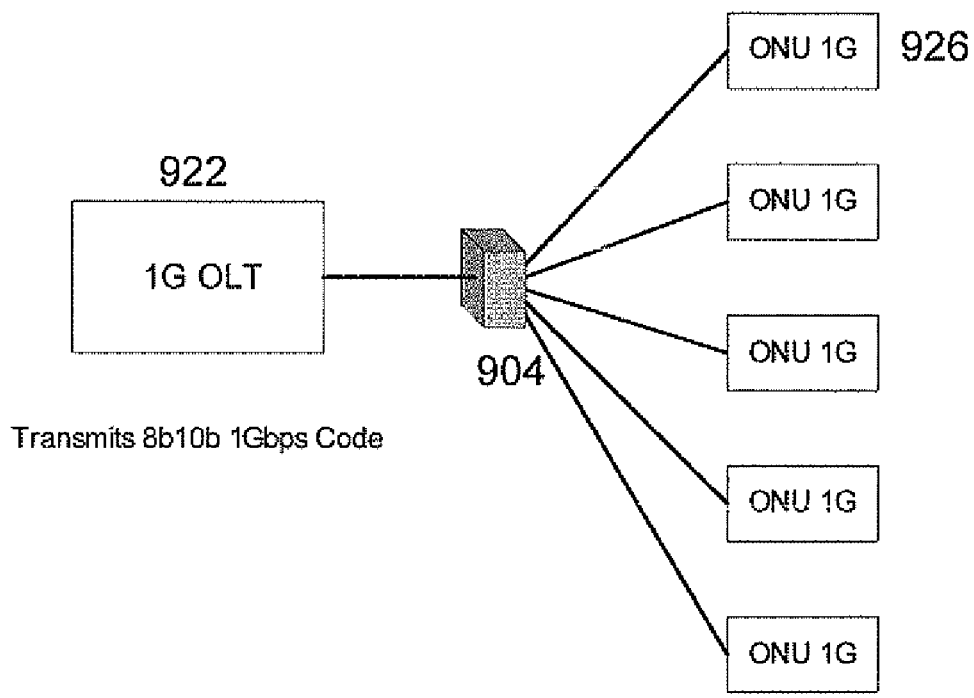
FIG. 9 shows an old EPON 1 Gbps 8b10b transmission system.
Figure 10:
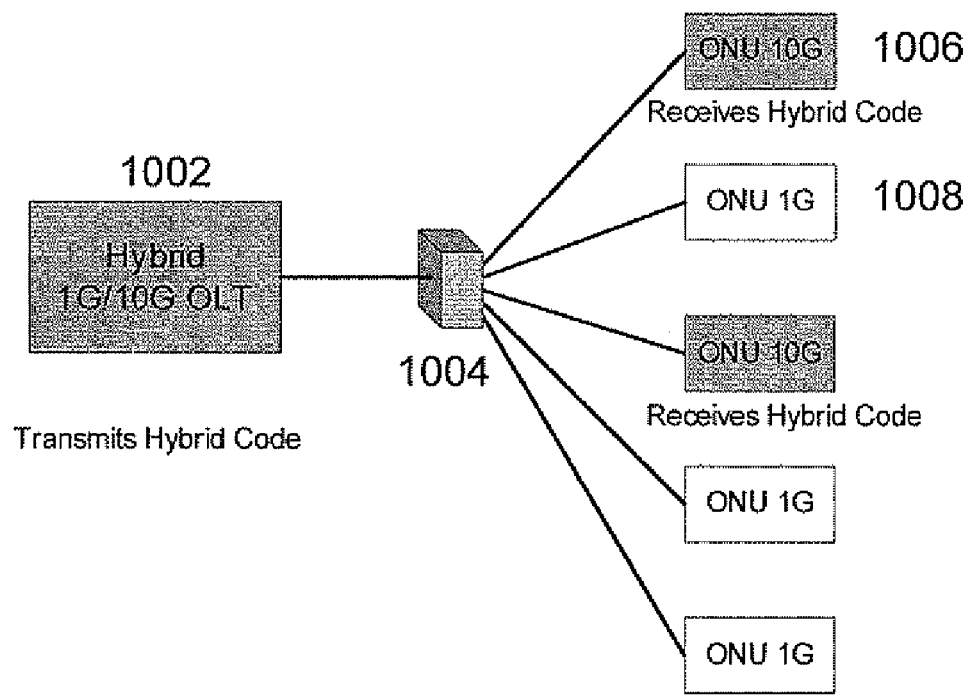
FIG. 10 shows a 10 Gbps EPON system compatible with 1 Gbps EPON System.

FIG. 9 shows an old EPON system in which an OLT 902 transmits 1 Gbps 8b10b encoded data to a plurality of ONUs 904. "ONU 1G" indicates that an ONU operates at 1 Gbps. FIG. 10 describes exemplarily a 1 Gbps EPON system modified to 10 Gbps. A "hybrid" OLT 1002 can now transmit a Hybrid Code instead of the 8b10 code. This enables an "old" CPE (Customer Premise Equipment) i.e. any ONU 1G, to receive low rate transmissions as before, while new CPEs (i.e. "ONU 10G", representing ONUs operating at 10 Gbps) can receive both high rate and low rate data. In other words, hybrid OLT 1002 now supports both old ONUs (ONU 1G) and new high rate ONUs (ONU 10G). Both "old" and "new" systems use an optical splitter 904 as part of the point to multi-point transmission in the PON system.

All patents mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. Those skilled in the art will appreciate that the invention can be embodied by other forms and ways, within the scope of the invention. The embodiments described herein should be considered as illustrative and not restrictive.

The invention claimed is:

1. A method for transmitting encoded data comprising the steps of:
   a) forming a hybrid balanced code from a low rate balanced code and a high rate low density code; and
   b) transmitting data encoded using the hybrid balanced code between a first communication network entity and a second communication network entity.

2. The method of claim 1, wherein the step of forming a hybrid balanced code includes performing a XOR operation between the low rate balanced code and the high rate low density code.

3. The method of claim 2, further comprising the step of separately detecting data encoded with the low rate balanced code and data encoded with the high rate, low density code.

4. The method of claim 3, wherein the detecting data encoded with the low rate balanced code includes using a low pass filter.

5. The method of claim 2, wherein the first communication network entity is an optical line terminal (OLT) and wherein the second communication network entity is an optical network unit (ONU).

6. The method of claim 5, wherein the low rate balanced code is a 8b10b code.

7. The method of claim 6, wherein the high rate low density code is a 4-bit data 8-bit symbol low density code.

8. The method of claim 2, wherein the low rate includes a 1 Gigabit per second (Gbps) rate and wherein the high rate includes a 10 Gbps rate.

9. The method of claim 5, wherein the OLT is a low rate OLT and wherein the ONU is a low rate ONU.

10. The method of claim 5, wherein the OLT is a hybrid OLT and wherein the ONU is an ONU selected from the group consisting of a low rate ONU and a high rate ONU.

11. A system for transmitting encoded data comprising:
   a) a first network unit for transmitting data coded in a hybrid balanced code formed from a low rate balanced code and a high rate low density code; and
   b) a second network unit operative to receive at least part of the data coded in a hybrid balanced code.

12. The system of claim 11, wherein the hybrid balanced code is formed by a XOR operation between the low rate balanced code and the high rate low density code.

13. The system of claim 11, wherein the first communication network entity is an optical line terminal (OLT) and wherein the second communication network entity is an optical network unit (ONU).

14. The method of claim 11, wherein the low rate balanced code is a 8b10b code.

15. The method of claim 14, wherein the high rate low density code is a 4-bit data 8-bit symbol low density code.

16. The method of claim 11, wherein the low rate includes a 1 Gigabit per second (Gbps) rate and wherein the high rate includes a 10 Gbps rate.

17. The method of claim 11, wherein the OLT is a low rate OLT and wherein the ONU is a low rate ONU.

18. The method of claim 11, wherein the OLT is a hybrid OLT and wherein the ONU is an ONU selected from the group consisting of a low rate ONU and a high rate ONU.

* * * * *